Aug. 22, 1939.  A. MUSHER  2,170,155
FOOD PRODUCT
Filed Oct. 4, 1937

Inventor
Albert Musher
By Sd Shappirio
Attorney

Patented Aug. 22, 1939

2,170,155

UNITED STATES PATENT OFFICE 2,170,155

FOOD PRODUCT

Albert Musher, New York, N. Y., assignor to Musher Corporation, Elizabeth, N. J., a corporation of New Jersey Application October 4, 1937, Serial No. 167,297

8 Claims. (Cl. 99—83)

This invention relates to food products, to novel compositions, articles, and packages containing such food products, and methods of producing such compositions, articles, and packaged products, and more particularly relates to food compositions in which an edible oil or fat enters into the compositions.

Compositions of various types employed for food purposes, and ingredients utilized in the production of or flavoring of food compositions, particularly when such food products or components exist in relatively dry condition, are usually packaged in such dry condition. A number of disadvantages flow from such food materials employed and packaged in this way, both from the standpoint of their use as food compositions, particularly when cooking operations are required, or when such components are introduced into products which are to be cooked or flavored, as well as from the standpoint of the packaging of such products, since difficulty arises in connection with the packaging of such materials to avoid deterioration caused by moisture, oxidation, etc.

Among the objects of the present invention is the production of novel types of food compositions and packages containing the same where the food compositions, or components to be utilized in connection with food compositions, are utilized in combination with edible oils or fats, and particularly fats or oils of such consistency that they are either solid or substantially solid or semi-solid at ordinary atmospheric temperatures.

Other objects of the present invention include novel packaging to enable more economical and ready distribution and utilization of such food compositions or components utilized therein.

Still further objects and advantages of the present invention will appear from the more detailed description set forth below, it being understood, however, that this more detailed description is given by way of illustration and explanation only, and not by way of limitation, since various changes therein may be made by those skilled in the art without departing from the scope and spirit of the present invention.

Figure 1:
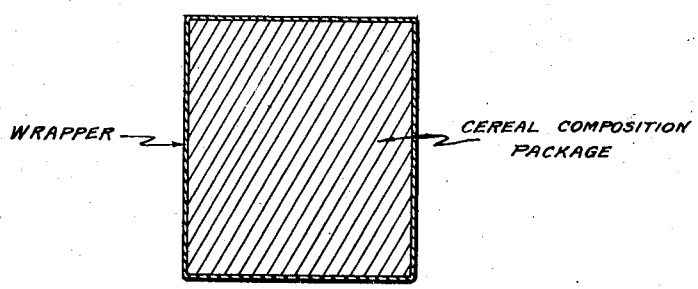
Figure 2:
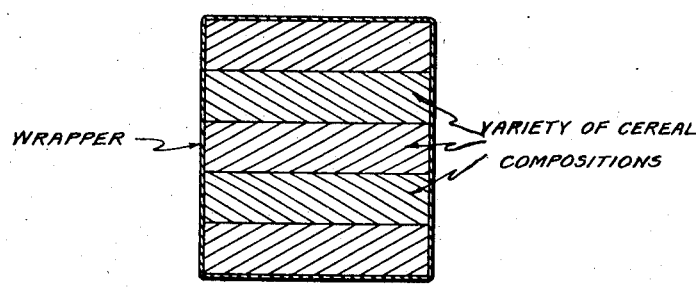
Figure 3:
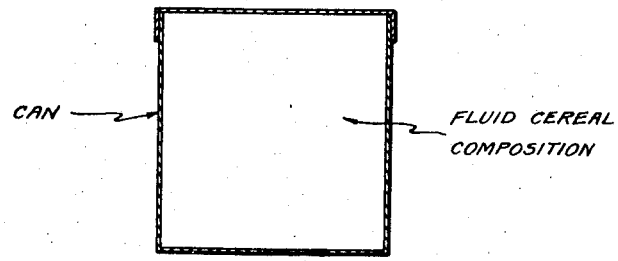

In connection with that more detailed description, there is shown by way of illustration in the accompanying drawing, in Figure 1, a food composition in brick form packaged for distribution, illustrating one phase of the present invention; in Figure 2, a package containing a multiplicity of bricks of food materials of various types; and in Figure 3, a packaged composition of food material produced in accordance with the present invention where the composition is of more plastic or fluid character.

In accordance with the present invention food compositions or components for use in connection with food materials are carried in an oil or fat vehicle, particularly an oil or fat suitable for edible purposes. The oil or fat employed may be of any desired type, particularly of edible character, and may be solid or semi-solid, fat, wax, oil or similar products of animal, vegetable or mineral origin, or any desired combination of these materials, or modified types of oils or fats, such as hydrogenated and unhydrogenated products. Most desirably the oil or fat employed is of such nature that when employed in the composition with the stated food components or compositions, and in desired proportions, the resulting product is of substantially solid or semi-solid consistency, lending itself to distribution or marketing in substantially solid or semi-solid form enabling it to be converted into blocks or bricks, for example, of predetermined weight or food value.

The invention can be particularly illustrated in connection with the production of what may be called breakfast cereal products, that is, compositions produced with cereals used for breakfast foods, such as the cereals, grains, seeds, breakfast foods, illustrated, for example, by wheat, corn, oats, farina, psyllium seed, oatmeal, breakfast foods prepared from peanuts or soy beans, or various combinations of such materials. Such products may be either in their original form, or in final manufactured or commercially prepared form, as, for instance, in the form of pre-digested or pre-cooked cereals, or in combination with other foods, such as malt, sugar, etc. Other types of products, such as breakfast foods made from sea weed products may also be utilized in accordance with the present invention. Any such desired breakfast cereal material is desirably incorporated into or with a fat or oil to produce the desired product available for distribution and utilization, and particularly when the proportions of the components and nature of the oil or fat is such as to result in a product of substantially solid consistency, so that it may be utilized, packaged and distributed in brick form. The term "breakfast cereal" is utilized herein to cover particularly such materials as wheat, corn, oats, farina, oat meal and similar products widely employed today for breakfast food purposes.

Thus a substantially solid product may be produced by incorporating 17.5 grams of hydrogenated oil of edible character and substantially solid consistency with 30.0 grams of farina.

More desirably the cereal product is put up in a form where it contains substantially all of the solid components required in the final cooked cereal product, so that it is only necessary to add water or other liquid and cook to produce the product for direct use. Consequently and desirably there is incorporated with the breakfast cereal product and the oil or fat, such components as powdered milk, with or without condiments, such as salt and/or sugar, and such combination of the breakfast cereal material or combination of cereals with salt and/or milk or cream in powdered condition and/or sugar, and/or similar materials, is desirably employed in the production of these products.

The following is an example of such a mixture of components that may be utilized for breakfast cereal purposes: hydrogenated edible oil of substantially solid consistency 17.5 grams, powdered milk 6.0 grams, salt .7 gram, and farina 30.0 grams.

The components of such mixtures of either of the types set forth above may be incorporated in any desired way. More desirably intimate incorporation of the various components with the oil or fat vehicle is desirable.

Thus the dry materials may be sifted together, and mixed thoroughly with the solid or semi-solid fat. The oil or fat may be unheated, particularly if soft enough to allow the proper beating so as to permit the dry materials to be mixed therein. It has been found preferable, however, to melt the oil or fat in order to get the best results. If the fat is melted, it is usually desirable to stir together the fat and dry ingredients until the fat begins to congeal, so that the thorough dispersion of the dry ingredients may be maintained until the fat is substantially hard enough to hold the other components in suspension therein. If the products are of this character, so that a substantially solid block material results on cooling, the individual bricks or blocks may then be molded, cut or otherwise handled for packaging.

Any other method of intermixing the components may be employed. Thus the cereal may be put into the fat and both heated together, or the fat may be heated until it is sufficiently hot and liquid and the cereal then added, and further after the cereal and oil or fat, with or without other added ingredients, are admixed in any desired way, they may be cooled either gradually, or they may be chilled rapidly on a chill roll, or in any other manner.

After the admixture of the ingredients and their incorporation together, the product may be placed in containers or molds loosely, with or without sifting or shaking, or the product may be compressed under and to different degrees of pressure, ranging from a relatively light pressure to relatively heavy pressure. Differences in consistencies of the material and shape of the product may thus be produced. Packing under pressure expels more or less of the fat from the interior of the composition, particularly if the fat is kept at a sufficiently warm temperature, so that the fat is either liquid or relatively soft. Cooling the product quickly on the other hand influences the absorption of fat. After the fat and cereal have been mixed together, the product may be pressed to form a brick, or it may be shaken until the fat is congealed, so as to result in the grains of cereal being coated with the hardened fat, but still not necessarily being in brick form.

Or if desired, the product may be converted into brick form in any manner as set forth above, and then the resulting product ground or treated to convert it into smaller pieces or fragments.

In the manufacture of the product, the cereal with or without other added ingredients may be permitted to stay in the warm or hot oil for a longer or shorter period of time, so as to influence higher or lower adsorption of oil, and so as to influence the result of the final product, as more particularly described below. Any of these different methods or procedures may be desired, any may in part depend on the nature of the composition itself undergoing manufacture, as well as on the form of the final product in which it is desired to produce such composition.

While treatment of the intermixed components, as pointed out above, may be employed, the materials may be converted into the desired form in other ways. Thus the cereal, with or without added components, and containing, for example, only a small amount of fat or other adhesive agent, may be compressed into more or less brick form and dipped into molten hardened fat, which upon congealing will form a coating about the brick of cereal with or without added components. Such brick may be coated further, if desired, with plastic or semi-hardened fat. Or if desired the entire composition of the character set forth in the second formula above may be produced and converted into brick form, and such block of material then dipped into or coated with an additional quantity of fat to give added covering and protection.

In utilization of a brick type of breakfast cereal product carried in a hardened oil or fat of the character described above, all that is necessary is for such cereal brick to be placed in a cooking pan with the desired amount of water, and cooked until the brick has melted and the cereal reduced to the condition desired. With the amounts set forth above in the specific examples there given, such brick produced from the components there set forth may be utilized, for example, with one cup of water. Thus it is possible to determine the size of the brick, so that when cooked with a specified amount of water, it will produce a desired quantity of cooked breakfast cereal, or the brick may be made up in a form where portions of it may be broken off and cooked with a stated amount of water to give a lesser quantity of cereal than if produced with the entire brick.

A particularly important result of the present invention is the fact that when the hardened fat brick containing cereal with or without added components, such as salt and powdered cream, is placed into the cooking vessel and the water added, as heat is applied, the brick does not melt all at once, but begins to melt slowly with the result that the combination of cereal with or without salt, powdered cream or powdered milk, etc., contacts the water gradually, so as to provide the maximum of smoothness and thoroughness of cooking. This procedure is comparable to the addition of cereal, salt and cream separately and slowly to the water. Accordingly a product produced in accordance with the present invention, although added at once to the water in which it is to be cooked, actually results in a slow intermixture of the product with the water, resulting in a diminution of lumping and more thorough cooking than can be obtained in any usual way.

Because of the nature of the substantially solid bricks that can be produced in accordance with the present invention, novel methods of packaging may be utilized and particularly enabling simple packaging to be employed in which a number of varieties of bricks of different types of cereals are incorporated into one and the same package. Whereas under present household conditions, it is necessary for the consumer to have a number of boxes of different types of cereals, such as oat meal, farina, etc., all of which boxes are used from time to time, and stand for considerable periods exposed to moisture and atmospheric deterioration, a single package of the character produced in accordance with the present invention and containing a number of bricks of breakfast cereal in which several different types of breakfast cereal bricks may be incorporated in a single package, enables a single package to be utilized in lieu of the variety of open packages of breakfast cereals of the character now available on the market. Thus a single package or carton may contain several bricks of farina, several bricks of oat meal, several bricks of wheat cereal, etc.

While the brick form of breakfast cereal carried in a vehicle of substantially solid oil or fat has been emphasized as the most desirable form of the present invention, the food compositions may be produced in other types of forms. Thus if the quantity of fat in the formulations given above is reduced from 17.5 grams, for example, to about 9.5 grams, there will be a materially lesser amount of fat or oil in the composition with the result that the final product may consist of grains of the breakfast cereal material carrying coatings of the hardened fat. Thus the cereal material may be coated with the fat by melting the fat and immersing the cereal, etc., into the fat, and then permitting the fat to harden. If mixed and sifted until cool, no brick will result, but the cereal will carry a fat or oil coating on the cereal granules, and even though in solid discrete particle form may be utilized and packaged as such, and while not offering all of the advantages of the brick or block form, the cereal product will have increased protection against mositure and atmospheric deterioration. A product of this character in the form of particulate granules, etc. may be subjected to pressure to convert it into brick form, the fat present as coating on the several granules, etc., serving to cause the particles to adhere together.

If the character of oil or fat employed and the proportions thereof in consideration with the other components of the composition is such as not to result in a substantially solid final product after admixture of the ingredients, or if substantially softer hydrogenated oils or similar products, such as of approximately 90 to 95° melting point are employed, the final product will be more or less plastic or liquid in character, and may be packaged in cans of the desired size, so that either the entire can may be utilized with a predetermined quantity of water, or portions of the can may be removed from time to time for cooking as desired. While packaging in brick form, as explained above, is more desirable for a number of reasons, such as the fact that the product exists in pre-weighed or pre-measured form, and enables more economical packaging, nevertheless the more or less plastic or fluid product offers protection of the cereal materials against moisture, dampness, infestation, oxidation, caking, etc.

In addition to the advantages which flow from the present invention as set forth above, a number of additional advantages appear from products produced in accordance with the present invention, among which the following advantages may be noted. Products of the present invention remain in good condition much longer and do not deteriorate to the same extent as cereals packaged in the usual way, because in the first place, the coating of fat or wax around the grains or pieces of cereal act as a waterproofing material, and do not permit moisture and dampness to cake the cereal or to harden it. Furthermore, the avoidance of dampness or moisture effects reduces fermentation and other similar forms of deterioration. In a similar manner, the fat or wax protects the cereal material against development of oxidized and similar off-flavors, and furthermore, it is impossible for weevils and similar insects to get to the cereals in view of the protective action of the fat, oil or wax. Elimination of weevil infestation is particularly important to packers of cereal products.

Since the preferred forms of products produced in accordance with the present invention are in solid brick form protected against various types of deterioration and infestation as referred to above, it is possible to package these products in simple paper wrappers, much the same as chocolate bars or baking chocolate is packaged today, while still insuring a product which will maintain itself against undesired deterioration, thus making it unnecessary to utilize a multiplicity of sheets of wax or otherwise protected paper, cartons, etc.

Uniformity of product is produced in accordance with this invention because of the dispersion of the various solid components, such as the breakfast cereal, with or without added materials, such as salt, powdered cream or milk, etc. throughout the oil or fat or wax vehicle, and not only is a more uniform product thus produced, but in the cooking operation the products cook more readily and more smoothly, lumping is reduced, and the resulting product is of far superior characteristics than can be produced by or with cereals of the character available today.

As against the dry mixes available today, in which segregation frequently takes place, products of the character produced in accordance with thhe present invention are free from such segregation, and the tendency for finer powdered material to settle to the bottom of the container. Thus uniformity is insured, even though shipment of the product may be required, and there is no tendency for loss or sifting of finer particles out of the package.

The nature of the products of the present invention is such that the products cook more readily and more quickly than the individual cereals do when utilized alone in the form in which they are available on the market today; and even though more rapid cooking is available, the resulting product has a smoother and creamier texture, freer from lumpiness and uncooked portions, etc. In fact, the nature of the product enables it to be cooked at higher temperatures if desired, with reduced adhesion or sticking to the pots, etc., while no bubbling or foaming to any substantial extent results, even though very rapid cooking is employed.

The inclusion of the oil or fat in the composition with the breakfast cereal material makes it unnecessary for the inclusion of butter, or similar materials in the final cooked cereal, so that a product produced in accordance with the present invention may be of such character that it includes all of the components necessary for consumption of the final cooked cereal, except for the addition of water for the usual cooking operation.

The products of this invention may be aerated in any desirable manner, so that they will have more tendency to float on the liquid, such as water, in which they are being cooked. Such aeration may take place in any desired way as by whipping the product while in fluid or plastic condition, so that there is substantial incorporation of air particles. The aerated product has desirable features in that there is less possibility for the cereal brick to sink to the bottom of the cooking container which results in decreased possibility of the cereal or other ingredients sticking to the bottom of the pot during cooking operation. As the heat melts the fat of such aerated product, the cereal and other components break or fall away from the brick in relatively small particles or pieces, and usually before they even reach the bottom of the cooking container, the cooking operation has been carried to a point where there is little likelihood of undesirable sticking to the container walls or bottom taking place.

Having thus set forth my invention, I claim:

1. An aerated block of a breakfast cereal, the particles of whic hare bonded together by an edible solid fat.

2. An aerated block of a breakfast cereal and a powdered milk product, the particles of which are bonded together by an edible solid fat.

3. As a food composition adapted to be cooked to form a cooked cereal product directly available for edible purposes: a breakfast cereal the particles of which are bonded together by an edible solid fat.

4. As a food composition adapted to be cooked to form a cooked cereal product directly available for edible purposes: a breakfast cereal and a powdered milk product, the particles of which are bonded together by an edible solid fat.

5. A food composition in brick form consisting of a cereal, an additional food component, and an edible solid fat, the consistency and proportions of the components being such as to give a substantially solid brick at normal atmospheric temperatures, the components being bonded together in the brick by the fat.

6. As a food composition adapted to be cooked to form a cooked cereal product directly available for edible purposes: an oatmeal the particles of which are bonded together by an edible solid fat.

7. As a food composition adapted to be cooked to form a cooked cereal product directly available for edible purposes: a farina the particles of which are bonded together by an edible solid fat.

8. A food composition in brick form consisting of a precooked cereal, an additional food component, and an edible solid fat, the consistency and proportions of the components being such as to give a substantially solid brick at normal atmospheric temperatures, the components being bonded together in the brick by the fat.

ALBERT MUSHER.